Figure 1:
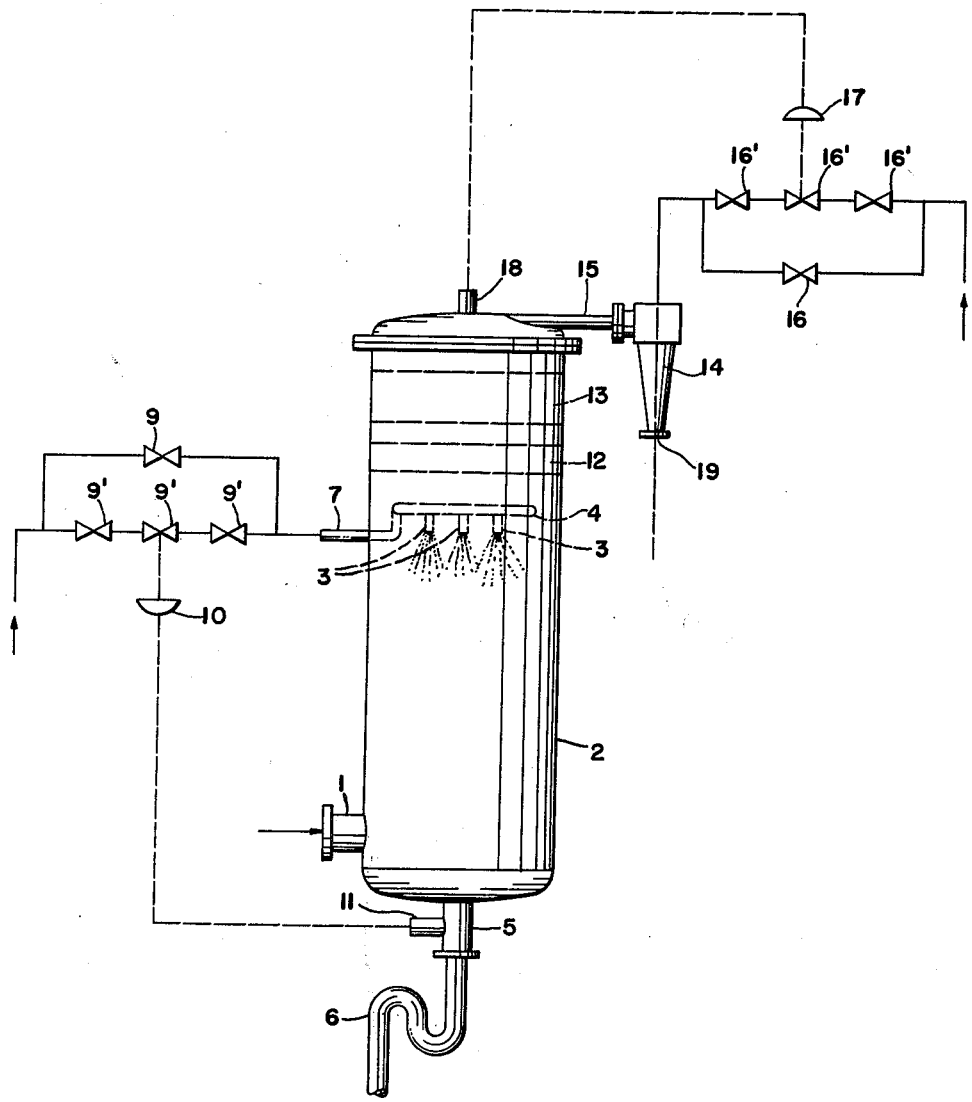

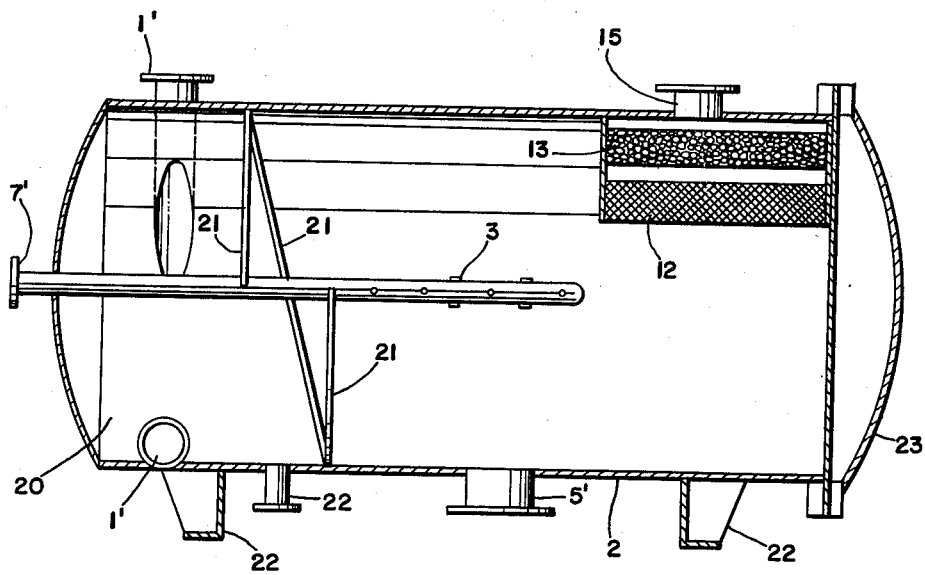
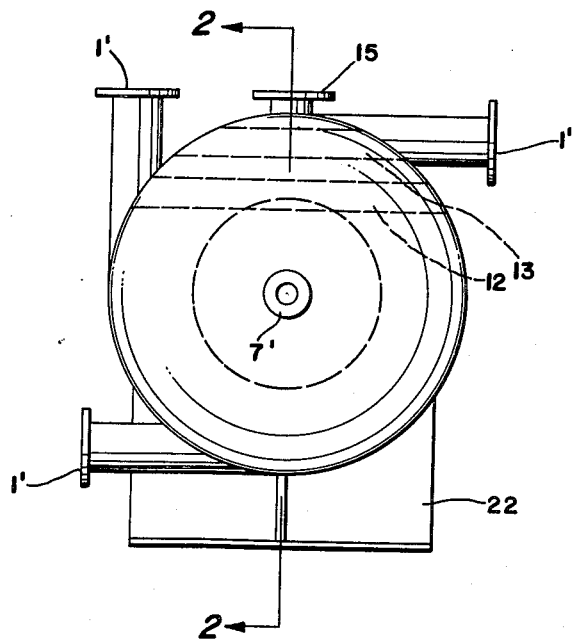

ized May 18, 1965

3,183,645
PROCESS FOR DEODORIZATION OF AN
ODIFEROUS ATMOSPHERE
Aaron J. Teller, Shaker Heights, Ohio, assignor to
Mass Transfer, Inc., Cleveland, Ohio
Filed Nov. 10, 1961, Ser. No. 151,584
10 Claims. (Cl. 55—20)

This invention relates to a process for removal of odor from odor-bearing atmospheres. More specifically, it relates to deodorizing gases from rendering vessels or cookers.

In the processing of various materials including waste in meat packing plants, a very strong stench permeates the atmosphere in the neighborhood of these plants because of the odoriferous materials which escape into the atmosphere as a result of these rendering or cooking operations. While attempts to decrease or avoid this stench have been made, they have been generally unsuccessful in view of the fact that a considerable amount of non-condensible gas emanates from these cookers. Since the removal of such odors does not involve recovery of any materials from the atmosphere which would have any economic advantage, the purpose of such removal is merely for improving the working conditions of plant employees and the living conditions for persons living in or passing through the neighborhood.

Therefore, the expense of such odor-removal is not offset in any way by recovery of chemicals, and in order to be attractive for such plants, must be inexpensive as well as efficient.

In accordance with the present invention, it has now been found possible to convert gases emanating from rendering vessels and other odoriferous atmospheres to an inoffensive atmosphere by use of the apparatus and process described herein.

The accompanying drawings illustrate a schematic view of the process of this invention in which the odoriferous gas is passed into a spray chamber and thereafter is passed through a demisting zone before passage through a bed of adsorbent material such as activated carbon, the non-condensible gases being pulled through the bed by a vacuum applied on the opposite side of the adsorbent bed, preferably by a steam ejector.

The gas from the cookers, etc. enters into the spray chamber in a lower region and is drawn upward toward the water sprays by a vacuum which is applied at the gas outlet end of the apparatus which is at a point remote from the gas inlet. The spray section is located between the gas inlet and the gas outlet.

Steam and other easily condensible vapors are condensed by the cooling effect of this spray and the condensate falls to the bottom of the chamber with the spray water and passes through an outlet having a hydrostatic leg to insure the reduced pressure conditions. The non-condensed gas is then passed through a demister which can comprise a finely knit wire mesh preferably having an open space therein of about 80–90 percent. This demister removes entrained liquid and solid particles so that they are not deposited in the bed of adsorbing material through which the gas is next passed.

This adsorbent material is preferably activated carbon, although any other adsorbent material can be used that will serve as an adsorbent or otherwise effect removal of the odiferous element.

By condensing the condensible vapors from the steam as well as removing entrained liquid from the steam before the non-condensible gases are admitted to the bed of adsorbing material, it has been found in accordance with the practice of this invention, that the adsorbent is allowed to act more efficiently and in a more concentrated fashion on the offensive or odiferous material and thereby to effect more efficient removal of odor from the gas stream.

The separation of the non-condensible gases from the condensible material is effectively controlled and directed by the application of the vacuum on the outlet side of the adsorbing bed. This vacuum or decreased pressure is inexpensively and advantageously effected by a steam ejector or aspirator which has the low pressure side connected to the outlet of the deodorizing equipment. The exhaust from the ejector or aspirator can be connected to the outside atmosphere and the exhaust steam from the ejector together with the deodorized gas can be passed directly into the outside atmosphere.

The process of this invention is best illustrated by reference to the drawings. In the modification shown in FIG. 1, the odiferous gas is fed through inlet 1 into the lower section of chamber 2 in which sprays 3 are located at an intermediate point so that the odoriferous gas must pass through the spray region. In this case, the sprays are supplied with spray water from manifold 4. The spray water and condensate are drained from the bottom of the chamber through outlet 5 which has hydrostatic leg 6 to prevent air from being drawn into the chamber by the vacuum which is maintained therein. Water is supplied to the manifold and sprays through water inlet 7. Valves 9 and 9' are appropriately adjusted and the water flow is controlled by control 10 which is automatically adjusted in accordance with the temperature of the water in the outlet from the spray chamber. This control is actuated through actuating means 11 which is responsive to the temperature of the outlet water.

After the spray zone, the non-condensible gas is passed through demister 12, which can comprise a series of finely knit wire mesh screens, for the removal of entrained liquid and solid particles. Following this, the gas is passed into an adsorbing bed 13 which can comprise finely divided particles of activated carbon. After passing through the bed of adsorbing material, the gas is completely deodorized and pulled through the top of a chamber by the vacuum effected on the upper region by steam ejector 14 which is connected to outlet means 15 of the chamber. The rate of steam feed into the ejector is controlled by valves 16 and 16' which are adjusted to give the appropriate conditions and are controlled by steam flow control 17 which reacts to the pressure in the top region of chamber 2 by virtue of pressure sensing means 18 connected at the top of chamber 2. Exhaust steam and deodorized gas pass through outlet 19 of steam ejector 14.

FIG. 2 shows a modification of the process of this invention in which the spray chamber is arranged in a horizontal position and the apparatus is further modified by the insertion of a cyclone separator through which the gas is passed prior to entry into the spray chamber. The odiferous gas is passed through tangential inlets 1' which aid in giving a circular motion to the gas as it enters into the chamber 20. Spiral baffle 21 accentuates the centrifugal force applied to the gas thereby aiding in the precipitation or deposit of entrained fats. The fats thus removed by centrifugation in this cyclone separator section drain out of outlet 22 and then pass into the spraying zone of chamber 2 wherein spray nozzles 3 are arranged tangentially to aid in the spiral motion for promoting the separation of the condensate from the non-condensible gas stream. The spray water and condensate are removed through bottom outlet 5'. Water is fed into the spray nozzle through water inlet 7'. This unitary arrangement of equipment rests on supporting legs 22. The non-condensible gas is passed from the spray zone through demister 12, following which it passes through adsorbing bed 13 and then out outlet 15. The vacuum applying means (not shown in this figure) is attached to outlet 15. Hinged cover 23 is designed to permit easy access to the interior of the equipment for cleaning and repair.

FIG. 3 shows an end view of the equipment of FIG. 2 taken from the water inlet side.

The cyclone separator section shown in FIG. 2 has proved very successful in the recovery of fats entrained in the gas stream coming from cookers. Normally, about 1–2% of the fat charged to the cookers is lost by entrainment in this gas stream. This cyclone separator modification of this invention effects a recovery of at least half of this lost fat.

In operating according to the process of this invention, a vacuum of between 0.25 and 14 inches of mercury is maintained on the exit side of the adsorbing bed.

In operating according to the process of this invention, it has been found that very effective deodorization can be accomplished and various improvements over previous practice can be effected. As an illustration of the effective operation accomplished by this invention, a fully automated unit having a chamber three feet in diameter and eight feet high of the design shown in FIG. 1, utilizing 125 gallons per minute of water and 50 pounds of steam per hour, was able to completely deodorize the non-condensible gases and to effectively condense the steam from 4 rendering units and one blood cooker which provided an average of 4,000 pounds per hour of steam together with the non-condensible and odoriferous gases. In addition to the solution of the air-pollution problem, the efficiency of the cookers was increased 5 to 10 percent because of the improved conditions resulting from the process and apparatus of this invention. In addition, the water consumption was decreased 25 percent compared with that used in previous operation whereby the gas was merely sprayed with water. Moreover, the resultant dried blood product was increased in value because of the improved drying conditions that were effected. Furthermore, because of the lower boiling temperatures resulting from the use of this invention, the tallow product recovered from the rendering units had considerably less color than had previously been possible.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. A process for deodorizing an odiferous atmosphere comprising the steps of
    (a) passing said odiferous atmosphere into a spray zone wherein said atmosphere comes into intimate contact with a water spray;
    (b) passing said atmosphere from said spray zone through a demisting means adapted to remove entrained liquid therefrom;
    (c) passing the resultant demisted atmosphere through a bed of adsorbent material capable of adsorbing odiferous material from said atmosphere;
    (d) maintaining a decreased pressure of 0.5–14 inches of mercury at the outlet side of said adsorbent bed, said decreased pressure being effected by a steam aspirator with the rate of steam flow to said steam aspirator being controlled automatically according to the pressure of the exit gas from said adsorbent bed; and
    (e) automatically adjusting the rate of water flow to said spray according to the temperature of the exit water from said spray zone.

2. A process of claim 1 in which said demisting means comprises a finely knit mesh screen.

3. A process of claim 1 in which said adsorbent is finely divided activated carbon.

4. A process of claim 1 in which said odoriferous atmosphere comprises the atmosphere emanating from animal rendering vessels.

5. A process for deodorizing an odiferous atmosphere comprising the steps of
    (a) effecting tangential flow of said atmosphere in a manner adapted to remove entrained particles by centrifugation;
    (b) passing said odiferous atmosphere into a spraying zone wherein said atmosphere comes into intimate contact with a water spray;
    (c) passing the exit atmosphere from said spray zone through a demisting means adapted to remove particles of liquid and solid from said atmosphere;
    (d) thereafter passing said demisted atmosphere into a bed of adsorbent material capable of adsorbing odiferous material from said atmosphere;
    (e) maintaining a decreased pressure of 0.5–14 inches of mercury at the outlet side of said adsorbent bed, said decreased pressure being effected by a steam aspirator with the rate of steam flow to said aspirator being controlled automatically according to the pressure of the exit gas from said adsorbent bed; and
    (f) automatically adjusting the rate of water flow to said spray according to the temperature of the exit water from said spray zone.

6. A process of claim 5 in which said demisting means comprises a finely knit mesh screen.

7. A process of claim 6 in which said screen has 80–90 percent open space therein.

8. A process of claim 5 in which said adsorbent is finely divided activated carbon.

9. A process of claim 5 in which said demisting means is a finely knit mesh screen, and said adsorbent material is finely divided activated carbon.

10. A process of claim 9 in which said odoriferous atmosphere comprises the atmosphere emanating from animal rendering vessels.

References Cited by the Examiner

UNITED STATES PATENTS

| | | | |
|---|---|---|---|
| 764,419 | 7/04 | Bruun | 55—468 XR |
| 1,307,705 | 6/19 | Scanes | 261—21 |
| 2,272,261 | 2/42 | Bergman | 261—39 |
| 2,303,331 | 12/42 | Dauphinee | 55—20 |
| 2,593,548 | 4/52 | Edwards | 261—118 XR |
| 2,758,665 | 8/56 | Francis | 55—183 |
| 2,792,070 | 5/57 | Strunk | 55—21 |
| 2,804,172 | 8/57 | Sender | 55—20 |
| 2,812,034 | 11/57 | McKelvey | 55—186 |
| 2,817,415 | 12/57 | Sykes | 55—236 XR |
| 2,868,313 | 1/59 | Leuszler et al. | 55—169 |
| 2,934,494 | 4/60 | Kleiber | 55—345 XR |

REUBEN FRIEDMAN, *Primary Examiner.*

HERBERT L. MARTIN, *Examiner.*